(12) United States Patent
Takeuchi (10) Patent No.: US 8,482,580 B2
(45) Date of Patent: Jul. 9, 2013

(54) DISPLAY CONTROL APPARATUS

(75) Inventor: Kengo Takeuchi, Yokohama (JP)

(73) Assignee: Canon Kabushiki Kaisha (JP)

( * ) Notice: Subject to any disclaimer, the term of this patent is extended or adjusted under 35 U.S.C. 154(b) by 1223 days.

(21) Appl. No.: 11/758,385

(22) Filed: Jun. 5, 2007

(65) Prior Publication Data

US 2008/0018666 A1 Jan. 24, 2008

(30) Foreign Application Priority Data

Jun. 5, 2006 (JP) ................................. 2006-156271

(51) Int. Cl.
*G09G 5/00* (2006.01)

(52) U.S. Cl.
USPC ...................... 345/619; 345/629; 348/333.02

(58) Field of Classification Search
USPC ...................................... 345/619; 348/208.16
See application file for complete search history.

(56) References Cited

U.S. PATENT DOCUMENTS

| 4,821,102 | A  | * | 4/1989  | Ichikawa et al. ............... 348/589 |
| 5,430,493 | A  |   | 7/1995  | Kim |
| 5,774,061 | A  | * | 6/1998  | Kudoh ........................ 340/7.55 |
| 6,011,537 | A  | * | 1/2000  | Slotznick ...................... 715/733 |
| 6,044,250 | A  | * | 3/2000  | Kuramatsu et al. ............ 340/7.4 |
| 6,323,935 | B1 | * | 11/2001 | Ebihara et al. .................. 355/53 |
| 7,394,485 | B2 | * | 7/2008  | Kim ........................... 348/220.1 |
| 7,412,467 | B2 | * | 8/2008  | Yang ............................ 708/105 |
| 7,417,668 | B2 | * | 8/2008  | Sasagawa .................. 348/220.1 |
| 7,509,045 | B2 | * | 3/2009  | Yamamoto .................... 396/287 |
| 7,519,268 | B2 | * | 4/2009  | Juen et al. ....................... 386/68 |
| 7,542,183 | B2 | * | 6/2009  | Satoh et al. .................... 358/484 |
| 7,590,871 | B2 | * | 9/2009  | Morisawa ..................... 713/300 |
| 7,599,581 | B2 | * | 10/2009 | Satoh et al. .................... 382/312 |
| 7,714,890 | B2 | * | 5/2010  | Okubo et al. ............. 348/208.16 |
| 7,907,203 | B2 | * | 3/2011  | Sugiyama et al. ........ 348/333.02 |
| 2003/0151687 | A1 | * | 8/2003 | Yoshida .................... 348/333.03 |
| 2005/0134689 | A1 | * | 6/2005 | Hatanaka .................... 348/207.1 |
| 2005/0140803 | A1 | * | 6/2005 | Ohtsuka et al. ............... 348/239 |

(Continued)

FOREIGN PATENT DOCUMENTS

| JP | 61-074474 A | 4/1986 |
| JP | 05-176248 A | 7/1993 |
| JP | 2007-200473 A | 8/2007 |

OTHER PUBLICATIONS

Notification of Reasons for Rejection issued in corresponding Japanese Patent Application No. 2006-156271 dated Aug. 31, 2010. Full English translation provided.

Office Action issued in corresponding Japanese Patent Application No. 2010-245294 dated May 23, 2011.

*Primary Examiner* — M Good Johnson (74) *Attorney, Agent, or Firm* — Rossi, Kimms & McDowell LLP (57) ABSTRACT

A display control apparatus that can display information which is not set to be displayed in a mode after switching, when the mode is switched. A mode of the apparatus is switched between a first mode and a second mode. Information set to be displayed in the first mode and the second mode is selected, respectively, among a plurality of kinds of information, and then the selected information are displayed on the display device, in the first mode and in the second mode. Information except for information which is set to be displayed in the second mode, among the plurality of kinds of information, is displayed in response to switching instruction from the first mode to the second mode.

10 Claims, 6 Drawing Sheets

| DISPLAY ITEMS | MODE 1 (RECORDING) | MODE 2 (PLAYING) | ON WHEN SWITCHING |
|---|---|---|---|
| ▭ REMAINING BATTERY LEVEL | ON | OFF | ○ |
| REMAINING AMOUNT OF MEDIUM | ON | OFF | ○ |
| CURRENT RECORDING TIME | ON | ON | |
| IMAGE QUALITY /IMAGE SIZE | OFF | OFF | |
| DATE AND TIME | OFF | ON | ○ |
| ○ SHOOTING SCENE, PORTRAIT, SPORTS, AND THE LIKE | ON | OFF | |
| PLAYING FUNCTION | OFF | OFF | |
| ⓌⒷ WHITE BALANCE | OFF | OFF | |
| ▢ EXPOSURE | ON | OFF | |
| FOCUS | ON | OFF | |
| ... | | | |
| ... | | | |

U.S. PATENT DOCUMENTS

| | | | |
|---|---|---|---|
| 2006/0087503 A1* | 4/2006 | Sasaki et al. | 345/211 |
| 2006/0173918 A1* | 8/2006 | Nakase et al. | 707/104.1 |
| 2007/0109426 A1* | 5/2007 | Satoh et al. | 348/231.2 |
| 2007/0109427 A1* | 5/2007 | Satoh et al. | 348/231.2 |
| 2007/0189752 A1* | 8/2007 | Kobayashi | 396/157 |

* cited by examiner

| DISPLAY ITEMS | MODE 1 (RECORDING) | MODE 2 (PLAYING) | ON WHEN SWITCHING |
|---|---|---|---|
| REMAINING BATTERY LEVEL | ON | OFF | ○ |
| REMAINING AMOUNT OF MEDIUM | ON | OFF | ○ |
| CURRENT RECORDING TIME | ON | ON | |
| IMAGE QUALITY /IMAGE SIZE | OFF | OFF | |
| DATE AND TIME | OFF | ON | ○ |
| SHOOTING SCENE, PORTRAIT, SPORTS, AND THE LIKE | ON | OFF | |
| PLAYING FUNCTION | OFF | OFF | |
| WHITE BALANCE | OFF | OFF | |
| EXPOSURE | ON | OFF | |
| FOCUS | ON | OFF | |
| ... | | | |
| ... | | | |

DISPLAY CONTROL APPARATUS

BACKGROUND OF THE INVENTION

1. Field of the Invention

The present invention relates to a display control apparatus, and more particularly, to a display control apparatus provided in a digital camera, a digital video camera, a mobile phone and the like.

2. Description of the Related Art

Conventionally, a video signal recording apparatus having a display apparatus provided with an image pickup apparatus for shooting a subject and a recording apparatus for recording a video of the shot subject has spread. This video signal recording apparatus has a recording mode for recording a video signal obtained by shooting the subject in a recording medium, and a playing mode for playing the video signal from the recording medium in which the video signal has been recorded. Moreover, this video signal recording apparatus has a function for displaying a recording mode display mode, an on-screen display mode, an unrecorded display mode and the like on the display apparatus with characters or icons (designs) for the respective modes, to inform a shooter about an operating status at that time and the like, with various characters or icons in the above described respective modes.

For example, in the recording mode, various camera settings such as a shooting mode such as a portrait setting, a shot image size, an image compression ratio, a white balance and the like, a remaining battery level, a remaining amount of a medium, date and time and the like are displayed with the characters or the icons. Moreover, in the playing mode, the remaining amount of the medium, the remaining battery level, the date and time and the like are mainly displayed with the characters or the icons to inform the shooter about the operating status at that time and the like.

With respect to these display apparatuses, various techniques have been proposed, such as a technique for performing the display for a while when a power is turned on, or a technique for performing the display for a while when the power is turned off (for example, see Japanese Laid-Open Patent Publication (Kokai) No. 5-176248 (U.S. Pat. No. 5,430,493)).

Furthermore, there is also a case where on/off of the display of the above described various setting information can be switched, the respective settings have been retained in the recording mode and in the playing mode, and display contents are different between the recording mode and the playing mode. For example, when the date and time information or the display of the remaining amount of the recording medium is turned off in the recording mode, the date and time or the display of the remaining amount of the medium does not appear, even if the mode is switched to the playing mode. This is a case where, for example, a user feels that the various marks or characters displayed on the display apparatus during the shooting are cumbersome and changes display settings.

However, in the above described conventional video signal recording apparatus, when the user has forgotten the displayed contents due to repetitive mode switching or over time, the display settings are required to be reset for displaying the contents again.

Moreover, since there are two display settings, that is, the display setting in the recording mode and the display setting in the playing mode, the user may not know which display setting is on.

Furthermore, with respect to the display performed for a few seconds when the mode is switched, the contents displayed in the mode after the switching are not required to be displayed when the power is turned on and the like. However, when the power is turned off and the like, once the contents have been set not to be displayed, the user cannot know an item as a rough indication of necessary refill or replacement when the power is turned off, such as the remaining amount of the medium or the remaining battery level.

SUMMARY OF THE INVENTION

The present invention provides a display control apparatus that can display information which is not set to be displayed in a mode after switching, when the mode is switched.

In a first aspect of the invention, there is provided with a display control apparatus, comprising: a mode switching unit adapted to switch a mode of the apparatus between a first mode and a second mode; and a display control unit adapted to select information set to be displayed in the first mode and the second mode, respectively, among a plurality of kinds of information, and then display the selected information on the display device, in the first mode and in the second mode, wherein the display control unit displays information except for information which is set to be displayed in the second mode, among the plurality of kinds of information, in response to a switching instruction from the first mode to the second mode.

The display control unit can select a part of the information except for the information which is set to be displayed in the second mode, among the plurality of kinds of information, and can display the selected information in response to the switching instruction from the first mode to the second mode.

The display control apparatus can further comprise a setting unit adapted to set importance to the plurality of kinds of the information to be displayed, respectively. The display control unit can select information which is set high in the importance by the setting unit, from the information except for information which is set to be displayed in the second mode, among the plurality of kinds of information.

The first mode can be a playing mode and the second mode can be a recording mode.

The first mode can be a moving image shooting mode and the second mode can be a still image shooting mode.

The display control unit can display the information except for the information which is set to be displayed in the second mode, for a predetermined period, and then can display the selected information to be displayed in the second mode, in response to the switching instruction from the first mode to the second mode.

The display control unit can display the information except for the information which is set to be displayed in the second mode, instead of the information to be displayed in the first mode, for a predetermined period, and then can display the information to be displayed in the second mode, in response to the switching instruction from the first mode to the second mode.

The display control apparatus can further comprise a setting unit adapted to arbitrarily set the information to be displayed in the first mode and to arbitrarily set the information to be displayed in the second mode, in response to the switching instruction from the first mode to the second mode.

In a second aspect of the invention, there is provided a display control apparatus comprising: a mode switching unit adapted to switch a mode of the apparatus between an operating mode and a power off mode; and a display control unit adapted to select information set to be displayed in the operating mode, among a plurality of kinds of information, and then display the selected information on the display device, in the operating mode, wherein the display control unit displays information except for information which is set to be displayed in the operating mode, for a predetermined time, among the plurality of kinds of information, in response to switching instruction from the operating mode to the power off mode, and the mode switching unit switches the operating mode to the power off mode, after the display control unit has displayed information except for information which is set to be displayed in the operating mode, for a predetermined time, in response to a switching instruction from the operating mode to the power off mode.

The display control unit can select a part of the information except for the information which is set to be displayed in the operating mode, among the plurality kinds of information, and can display the selected information in response to the switching instruction from the operating mode to the power off mode.

The display control apparatus can further comprise a setting unit adapted to set importance to the plurality of kinds of the information to be displayed, respectively. The display control unit can select information which is set high in the importance by the setting unit, from the information except information which is set to be displayed in the operating mode, among the plurality of kinds of information.

According to the above described configuration, during or immediately after a switching transition from the first mode to the second mode of the device, among the information which is not set to be displayed in the second mode, predetermined information is displayed for a predetermined time improving convenience for uses.

Moreover, according to the above described configuration, during or immediately after a switching transition from a predetermined mode to the power off of the device, among the information which is not set to be displayed in the predetermined mode, predetermined information is displayed for a predetermined time, improving the convenience for the users.

The importance can be set to each piece of the information to be displayed. The above described predetermined information can be information which is set high in the importance, for example, date and time or a white balance during the mode switching transition, and a remaining battery level or a remaining amount of a recording medium when the power is turned off. Thereby, the convenience for the users can be further improved during or immediately after the switching transition.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the drawings.

Figure 1:
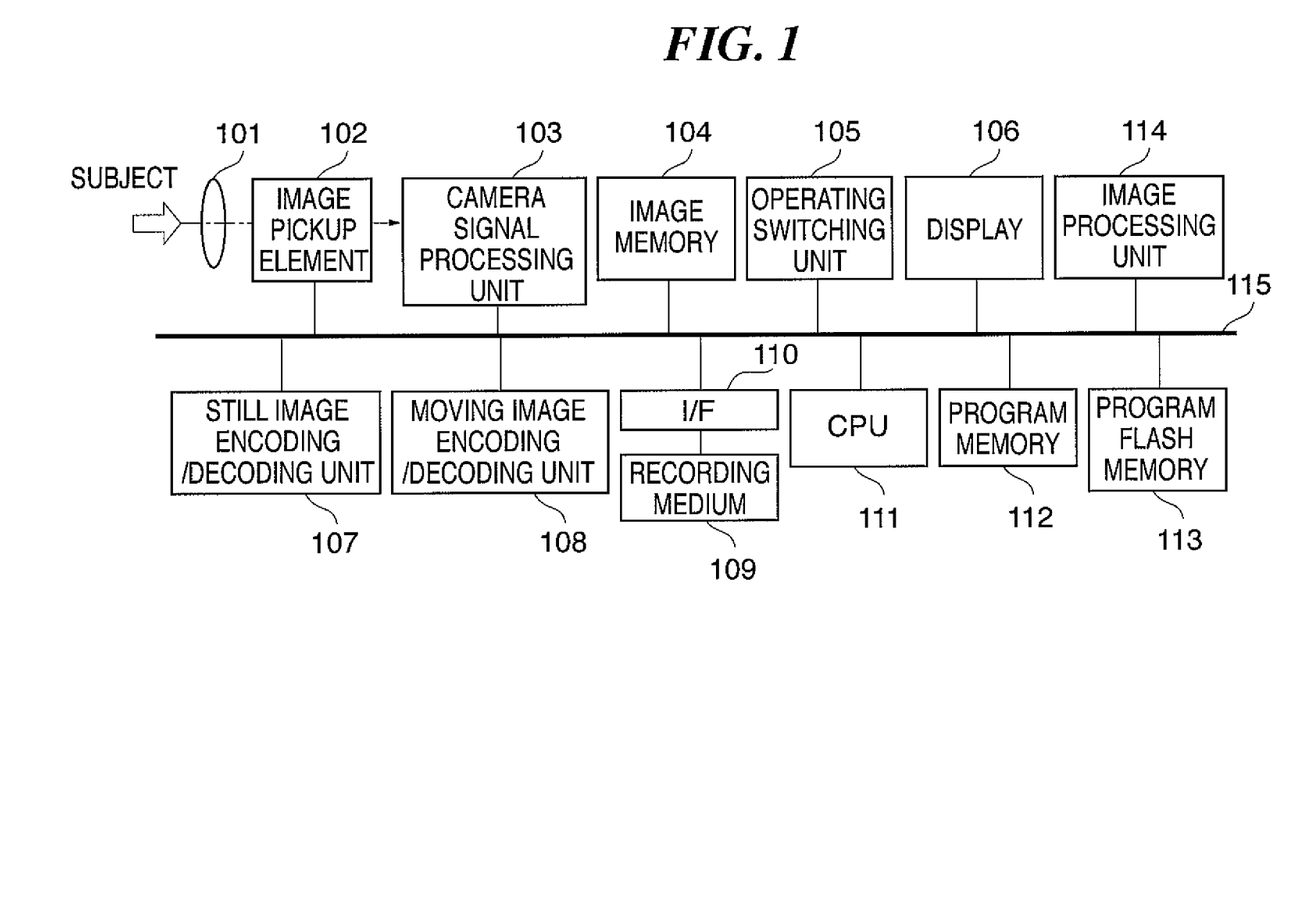
FIG. 1 is a diagram schematically showing an internal configuration of a camera having a display apparatus provided with a display control apparatus according to an embodiment of the present invention.

FIG. 1 is a diagram schematically showing an internal configuration of a camera having a display apparatus provided with a display control apparatus according to an embodiment of the present invention.

In FIG. 1, an integrated camera having a display apparatus capable of recording and playing moving images is provided with a lens 101, an image pickup element 102, a camera signal processing unit 103, an image memory 104, an operating switch 105, a display 106 and a still image encoding/decoding unit 107. The integrated camera is also provided with a moving image encoding/decoding unit 108, an I/F 110 for a recording medium 109, a CPU 111, a program memory 112, a program flash memory 113 and an image processing unit 114. Components except the lens 101 and the image pickup element 102 are connected to one another via a bus 115.

An operating mode of the above described integrated camera is switched to three main modes, that is, a power off mode, a recording mode and a playing mode, with a main mode change-over switch within the operating switch 105.

When the camera is started, a program compressed within the program flash memory 113 is decompressed/expanded into the program memory 112, and the CPU 111 operates according to the program within the program memory 112 to perform various control operations as follows.

When the operating switch 105 is set to the recording mode and started, a light from a subject is imaged on the image pickup element 102 through the lens group 101. A subject image imaged on the image pickup element 102 is photoelectrically converted to an electrical signal. The photoelectrically converted image from the image pickup element 102 is read out at a predetermined period, signal-processed so that it becomes a standard moving image signal in the camera signal processing circuit 103, and temporarily stored in the image memory 104. Simultaneously, this moving image is sent to the display 106, on which the moving image being picked up is displayed (shooting waiting state).

In the shooting waiting state, when a shooting button (not shown) within the operating switch 105 is depressed, shooting is started. When the shooting is started, an original moving image temporarily stored in the image memory 104 is compressed and encoded into a moving image in the moving image encoding/decoding unit 108, and then, sequentially recorded in the recording medium 109 through the interface 110. When the shooting button included in the operating switch 105 is depressed again, the recording is completed and recording of one cut of moving image clip is completed.

On the other hand, in the above described shooting waiting state, when a still image shooting button (not shown) within the operating switch 105 is depressed, the image read out from the image memory 104 is compressed and encoded as a still image in the still image encoding/decoding unit 107, and then recorded in the recording medium 109.

Moreover, when the operating switch 105 is switched to the playing mode, the CPU 111 checks the moving images or the still images in the recording medium 109, arranges and displays thumbnail icons of the still images or the moving images on the display 106. When a user operates to select the thumbnails, the selected still images or moving images are sequentially read out and displayed on the display 106.

In this embodiment, in the recording mode and the playing mode, the user can arbitrarily set information to be displayed on the display 106.

In other words, it is possible to use the operating switching unit 105 to set a date and time indication, a remaining battery level, a remaining amount of the recording medium and the like to be displayed so that they can be superimposed and displayed on the moving images, the still images or the picked up images in the respective modes.

In addition to the information displayed commonly in the respective modes, information on settings or operating modes and the like specific to the respective modes can be displayed.

For example, in the recording mode, information on a white balance, an exposure setting, a focus setting and the like as camera settings, information on a compression ratio of the recorded image and the like can be displayed. Moreover, in the playing mode, a shooting date and time of the moving image or the static image which is being played, a file data size, information on playing functions provided (slide show, fast forwarding, slow playing and the like) and the like can be displayed.

Figure 2:
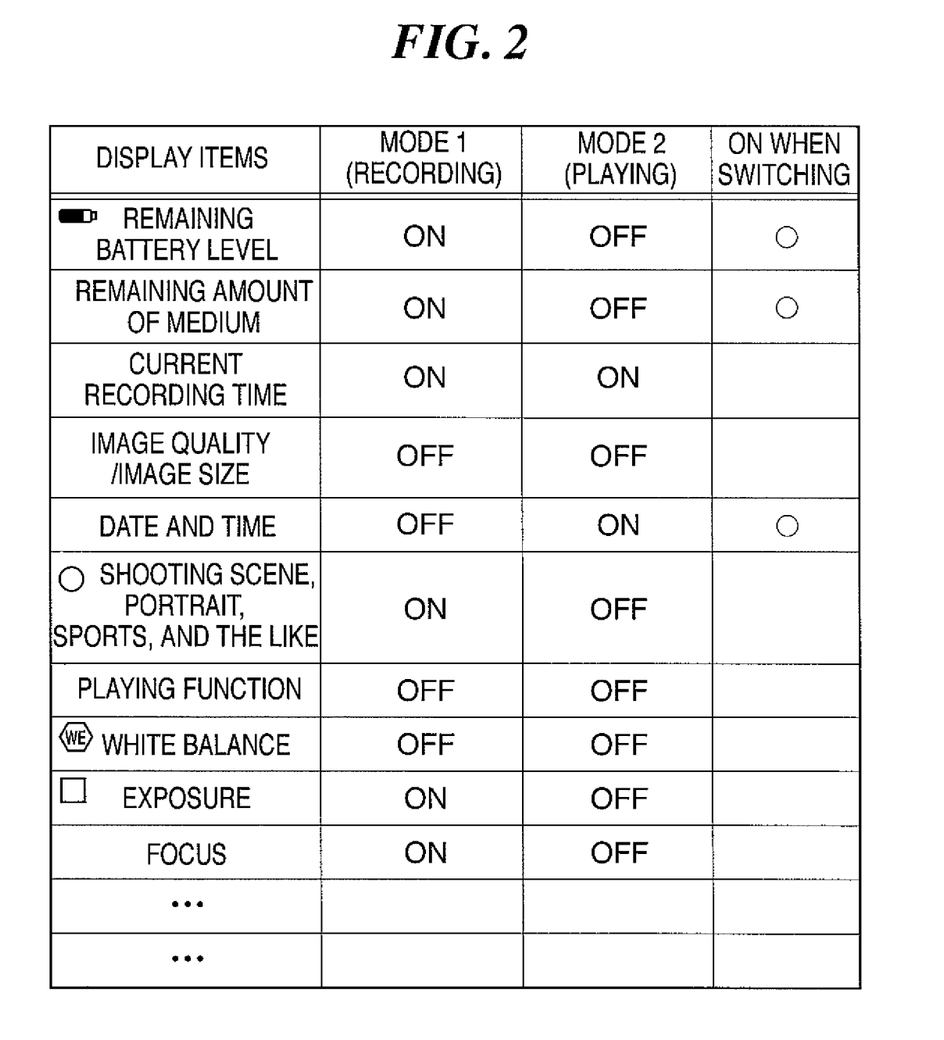
FIG. 2 is a diagram showing an example of setting information for each operating mode in the camera having the display apparatus of FIG. 1.

According to the display settings, these respective items are displayed on the display 106 with shot images or played images in the respective modes. Moreover, the setting information in which the display settings have been performed in these respective operating modes is retained on the program flash memory 113 for each operating mode. FIG. 2 shows an example of the setting information for each operating mode.

In FIG. 2, the display items indicate the kinds of pieces of information which are capable of being displayed on the display 106, respectively. FIG. 2 shows whether each of the display items is set to "ON" or "OFF" for each of the modes. Here, when any one of the display items is set to "ON", information is displayed therefor, whereas when any one of the display items is set to "OFF", information is not displayed therefor.

For example, in FIG. 2, the remaining battery level is displayed in the recording mode, whereas it is prohibited to be displayed in the playing mode.

Moreover, in the example of FIG. 2, among display items, "playing function" includes information showing a state in which a continuous playing function or a random playing function is set during playing of images to by played.

Figure 3:
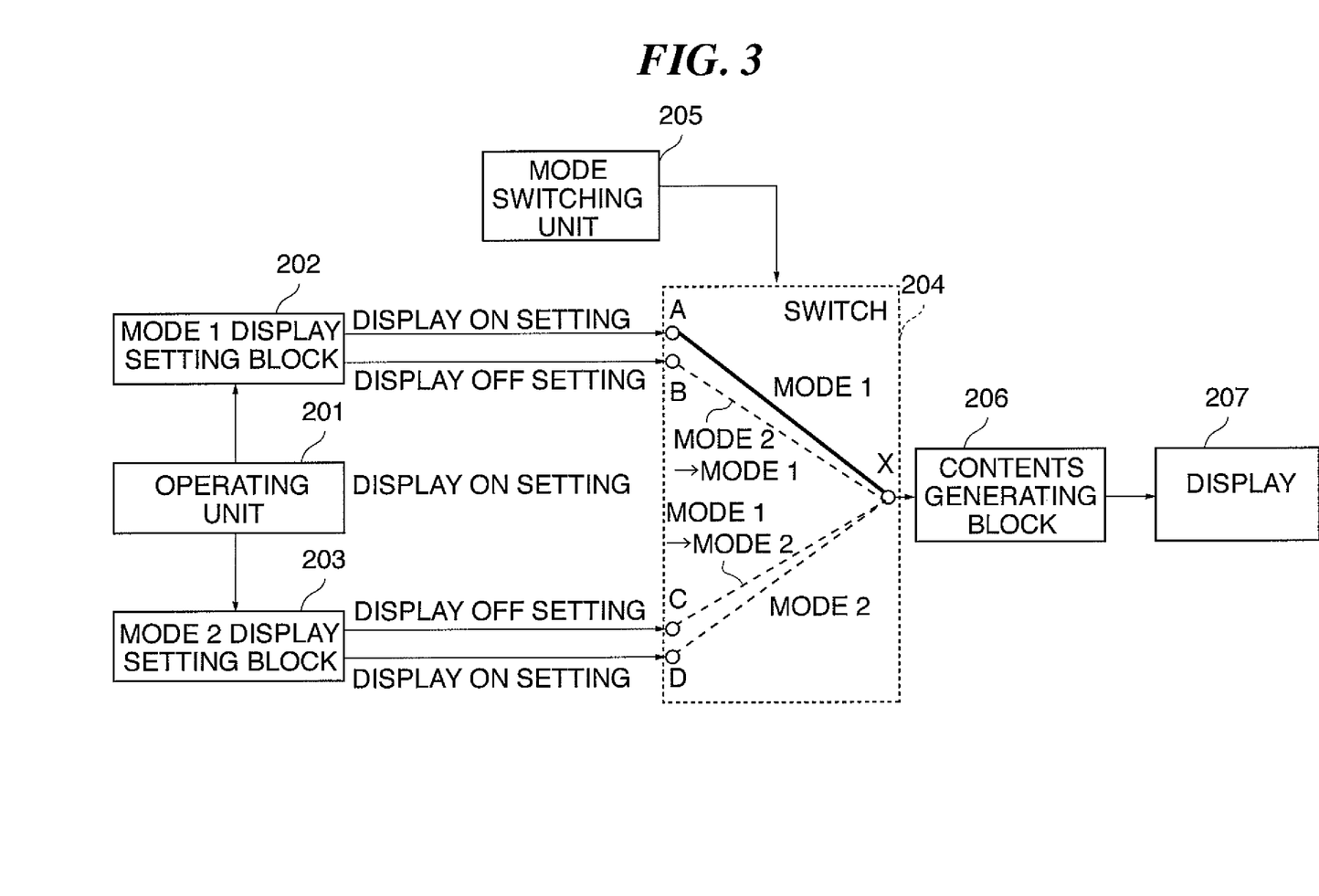
FIG. 3 is a diagram illustrating a display control operation when the operating mode is switched, in the camera having a display apparatus capable of recording and playing moving images of FIG. 1.

FIG. 3 is a diagram illustrating a display control operation when the operating mode is switched, in the camera having the display apparatus capable of recording and playing the moving images of FIG. 1.

In FIG. 3, the CPU 111 has multiple functional blocks. These functional blocks consist of a Mode 1 display setting block 202 for setting information to be displayed in Mode 1 (for example, the recording mode), a Mode 2 display setting block 203 for setting information to be displayed in Mode 2 (for example, the playing mode), a switch 204, a mode switching unit 205, and a contents generating block 206 for generating contents to be displayed.

An operating unit 201 is equivalent to the operating switch 105, and sets information to be displayed in Mode 1 (for example, the recording mode) and in Mode 2 (for example, the playing mode). The switch 204 is switched according to mode switching of the mode switching unit 205 caused by the operating switch 105.

A display 207 displays contents which are generated by the contents generating block 206 according to the contents set for the display item, while being switched by the switch 204. It should be noted that an output of the switch 204 is one point of X, and depending on contents connected to this point, information to be displayed on the display 207 are selected and set by the contents generating block 206. Moreover, an input of the switch 204 has four points of A to D, in which a Mode 1 display ON setting, a Mode 1 display OFF setting a Mode 2 display OFF setting, and a Mode 2 display ON setting can be selected, respectively.

Figure 4A:
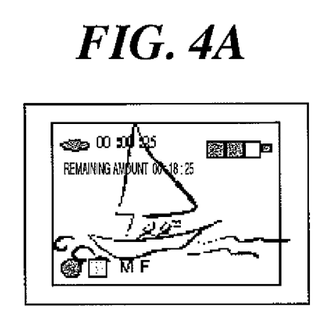
FIGS. 4A to 4D are diagrams showing display examples when the mode is switched, by the camera having the display apparatus of FIG. 1.

In other words, if a normal operation is being performed in Mode 1, a terminal A is connected to a terminal X, and the normal items set to display ON in Mode 1 are displayed (FIG. 4A).

In FIG. 4A, according to the information in FIG. 2, the items including the remaining battery level, the remaining amount of the medium, a recording time, a shooting mode, the exposure and the focus are arranged and displayed with the icons or characters, along with the picked up images on the display 106. Meanings of some icon displays are as shown in FIG. 2.

Figure 4B:
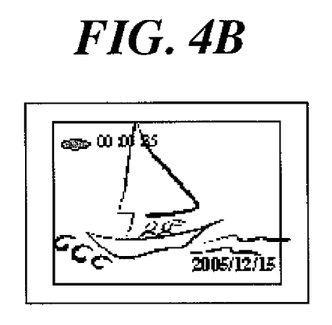

Similarly, if the normal operation is being performed in Mode 2, a terminal D is connected to the terminal X, and the items set to display ON in Mode 2 are displayed (FIG. 48).

During mode switching transition, a mode switching signal is generated by the mode switching unit 205, and then, during changing from one of the modes to the other of the modes, there is displayed information for the display item set to display OFF in the other of the modes for a few seconds as a mode transition state. For example, when the transition is performed from Mode 1 to Mode 2, a terminal C is connected to the terminal X, and the items set to display OFF in Mode 2 are set as the display contents (FIG. 4C).

Figure 4C:
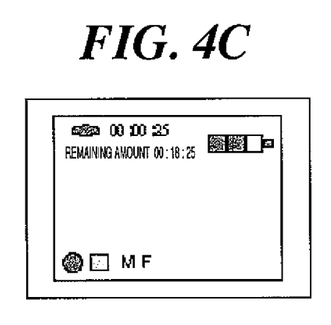

FIG. 4C is a diagram illustrating the display contents during the switching transition from Mode 1 to Mode 2, and the items set to display OFF in Mode 2 include the remaining battery level, the remaining amount of the recording medium, an image quality/image size, the shooting mode, the playing mode, the white balance, the exposure, the focus, and the like. Among these, information of the image quality/image size, the shooting mode, the white balance, the exposure, and the focus may be prohibited to be displayed because they are not necessary in the playing mode.

After the transition of the operating mode of the video camera has transmitted from Mode 1 (recording mode) to Mode 2 (playing mode), these display contents are still continuously displayed for a few seconds on the display 106, followed by eliminating display of information for the display item set to display OFF in Mode 2, as well as by displaying information for the display item set to display ON in Mode 2 (FIG. 4B).

Figure 4D:
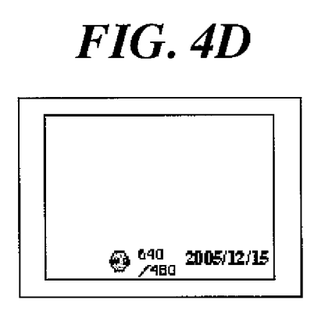

Similarly, when the transition is performed from Mode 2 to Mode 1, a terminal B is connected to the terminal X, and then information for the display item set to display OFF in Mode 1 is displayed for a few seconds, followed by displaying information for the display item set to display ON in Mode 1 (FIG. 4D).

FIG. 4D is a diagram illustrating the display contents during the switching transition from Mode 2 to Mode 1, and the items set to display OFF in Mode 1 include the image quality/image size, the playing function, the date, the white balance, and the like. Among these, information of the playing function may be prohibited to be displayed in the recording mode because it is not necessary in the recording mode After the switching transition from Mode 2 to Mode 1 has been completed, the CPU 111 still continuously displays the display contents for a few seconds on the display 106, followed by eliminating display of information for the display item set to display OFF in Mode 1, as well as by displaying information for the display item set to display ON in Mode 2.

It should be noted that although the display setting at this time has been set as shown in FIG. 2 and this setting has been retained on the program memory 112, the user can operate to change the setting.

Figure 5:
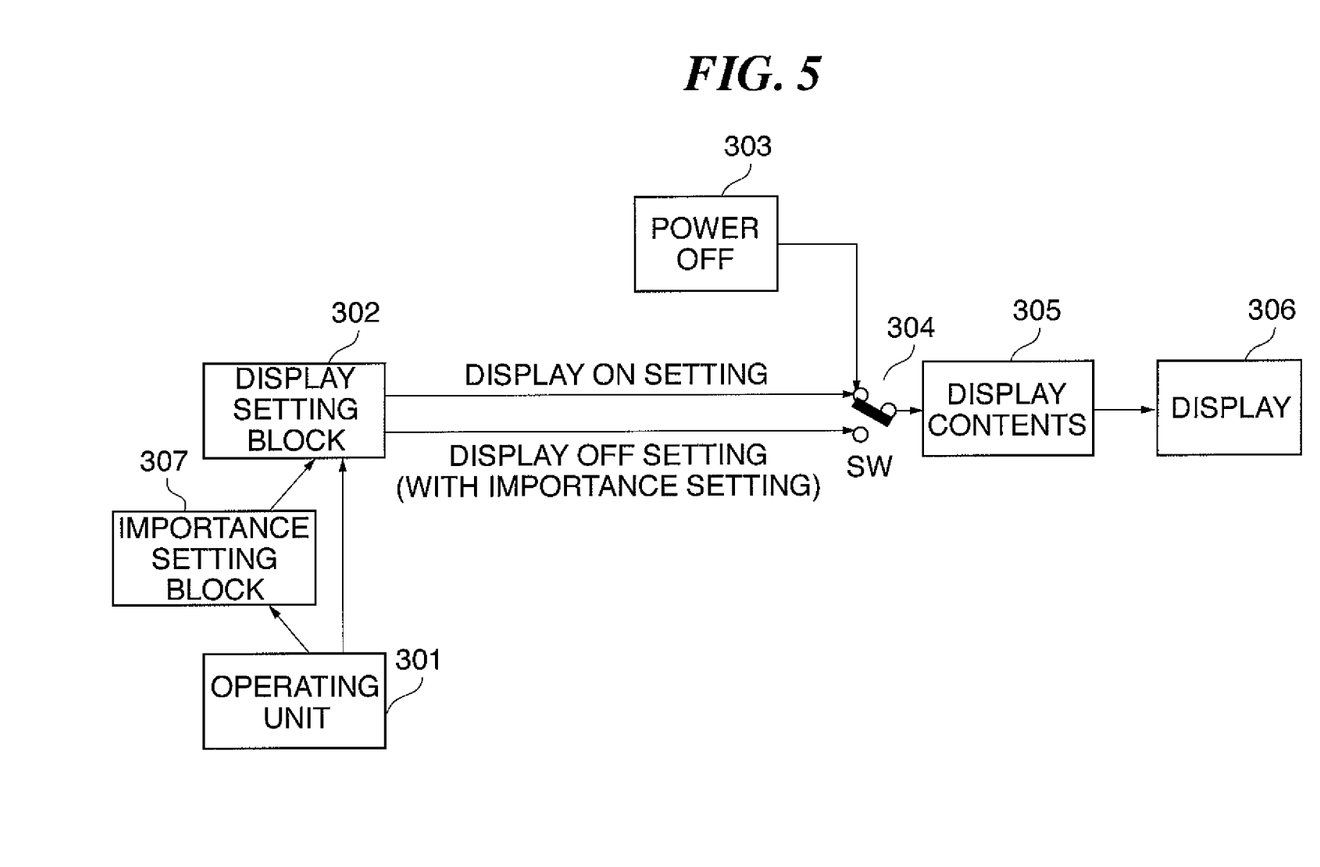
FIG. 5 is a diagram illustrating a display operation when a power is turned off, in the camera having the display apparatus capable of recording and playing the moving images of FIG. 1.

FIG. 5 is a diagram illustrating a display control operation when a power is turned off, in the camera having the display apparatus capable of recording and playing moving images of FIG. 1.

In FIG. 5, an operating unit 301 is equivalent to the operating switching unit 105, and causes a display setting block 302 to set the display. The display setting block 302 is performed with respect to the operating mode before the power is turned off. Then, the operating unit 301 is adapted to set information of the display items in any of the modes, a as well as to set importance to each piece of the information to which the display setting is performed.

The importance setting block 307 informs the item set to the importance among the display items in FIG. 2. The display setting block 302 sets the items, to which the importance is set, to ON when switching, among the display items in FIG. 2.

Figure 6A:
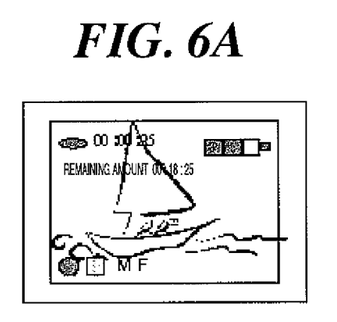
FIGS. 6A to 6D are diagrams showing display examples when the power is turned off, by the camera having the display apparatus of FIG. 1.
Figure 6B:
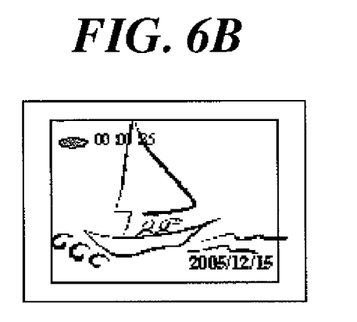

Also during switching of the operating mode between Mode 1 and Mode 2, the operation is performed according to the above described display control operation of FIG. 3, and objects of the items set to display ON are displayed on the display 106 in any of the modes (FIGS. 6A and 6B).

Figure 6C:
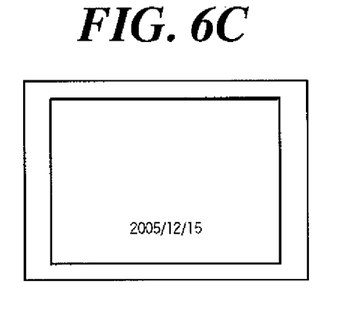
Figure 6D:
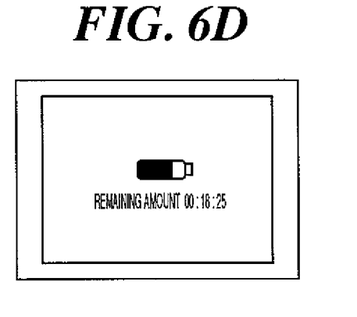

When a main switch instructs a power off 303, a switch 304 is switched for a few seconds to eliminate display of the information of the display items set to display ON in the pre-changed mode, followed by displaying the information of the display item, to which the importance is set, among the items set to display OFF in the pre-changed mode, before the power of the apparatus is turned off (FIGS. 6C and 6D).

In other words, when the power is turned off, only the items set to ON when switching as the importance setting, among the items set to display OFF in each of the modes, are displayed for a predetermined seconds on a display 306, before the power of the apparatus is turned off. Thereafter, the power of the apparatus is turned off. FIGS. 6A to 6D show an example thereof.

In FIGS. 6A to 6D, in the operating mode 1 (FIG. 6A), when the power is turned off, a main power is turned off after the items are displayed for a few seconds as shown in FIG. 6C. The items set to display OFF in an operating mode 1 include the date and time, the image quality/image size, the playing function and the white balance (FIG. 2), and among them, the item of ON when switching and having the importance setting is only the date and time information (FIG. 2). Hence, only the date and time information is displayed (FIG. 6C).

Moreover, in the operating mode 2 (FIG. 6B), when power is turned off, similarly, the main power is turned off after the items are displayed for a few seconds as shown in FIG. 6D. The items set to display OFF include the remaining battery level, the remaining amount of the recording medium, the image quality/image size and the like, and among them, the items of ON when switching and having the importance setting are only the remaining battery level and the remaining amount of the recording medium (FIG. 2). Hence, only those items are displayed (FIG. 6A).

In other words, the items other than normally displayed items are displayed when the operation is switched or when the power is turned off. It should be noted that the importance setting for the display can also be adapted when the mode is switched, which can be easily realized similarly to when the power is turned off. Moreover, although the display is performed for a predetermined time when switching, the time may be set and the display may be performed only during various ending operations.

In the above described embodiment, if the items set to display ON/OFF are marks and signs, these items may be replaced with characters or enlarged and displayed on the display 106.

In the above described embodiment, the first mode may be a moving image shooting mode, and the second mode may be a still image shooting mode. In this case, in the example of FIG. 2, the display items include a camera shooting mode such as a portrait or a firework, shooting information such as a recorded pixel count or a compression ratio, and various shooting conditions such as whether the focus is manual or auto, a flash and the white balance. These items are OFF in Mode 1 (recording), OFF in Mode 2 (playing) and ON when switching.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-156271 filed Jun. 5, 2006, which is hereby incorporated by reference herein in its entirety.

What is claimed is:

1. A display control apparatus, comprising:
a mode switching unit adapted to switch a mode of said apparatus between a first mode and a second mode in response to a switching instruction;
a setting unit adapted to set information selected from a plurality of selectable information as a first display item corresponding to the first mode, and set information selected from the plurality of selectable information as a second display item corresponding to the second mode; and
a display control unit adapted to display the information set as the first display item on a display device in the first mode, and display the information set as the second display item on the display device in the second mode,
wherein said display control unit displays in response to the switching instruction from the first mode to the second mode, information as a third display item among the plurality of selectable information, which has not been set as the second display item, instead of the information set as the first display item, for a predetermined period, and then displays the information set as the second display item.

2. The display control apparatus according to claim 1, further comprising a second setting unit adapted to set importance to the plurality of selectable information, respectively,
wherein said display control unit selects information displayed as the third display item which is set high in the importance by said second setting unit, from the plurality of selectable information, which has not been set as the second display item.

3. The display control apparatus according to claim 1, wherein the first mode is a playing mode and the second mode is a recording mode.

4. The display control apparatus according to claim 1, wherein the first mode is a moving image shooting mode and the second mode is a still image shooting mode.

5. A display control apparatus comprising:
a mode switching unit adapted to switch a mode of said apparatus between an operating mode and a power off mode in response to a switching instruction;
a setting unit adapted to set information selected from a plurality of selectable information as a display item corresponding to the operating mode; and
a display control unit adapted to display the information set as the display item on a display device, in the operating mode,
wherein said display control unit displays information as another display item among the plurality of selectable information, which has not been set as the display item, for a predetermined time, in response to the switching instruction from the operating mode to the power off mode, and
said mode switching unit switches the operating mode to the power off mode, after said display control unit has displayed the information as the another display item among the plurality of selectable information, which has not been set as the display item, for a predetermined time.

6. The display control apparatus according to claim 5, further comprising a second setting unit adapted to set importance to the plurality of selectable information, respectively,
wherein said display control unit selects information displayed as the another display item which is set high in the importance by said second setting unit, from the plurality of selectable information, which has not been set as the display item.

7. The display control apparatus according to claim 5, wherein said display control unit displays in response to the switching instruction from the operating mode to the power off mode, the information as the another display item at a first position different from a second position for displaying the information set as the display item in the operating mode.

8. The display control apparatus according to claim 7, wherein the first position is more shifted toward the center of the display device than the second position.

9. A method of controlling a display of information with a control apparatus, the method comprising the steps of:
switching a mode of said apparatus between a first mode and a second mode in response to a switching instruction;
setting information selected from a plurality of selectable information as a first display item corresponding to the first mode, and setting information selected from the plurality of selectable information as a second display item corresponding to the second mode;
displaying the information set as the first display item on a display device in the first mode, and displaying the information set as the second display item on the display device in the second mode; and
displaying in response to the switching instruction from the first mode to the second mode, information as a third display item among the plurality of selectable information, which has not been set as the second display item, instead of the information set as the first display item, for a predetermined period, and then displaying the information set as the second display item.

10. A method of controlling a display of information with a control apparatus, the method comprising the steps of:
switching a mode of said apparatus between an operating mode and a power off mode in response to a switching instruction;
setting information selected from a plurality of selectable information as a display item corresponding to the operating mode; and
displaying the information set as the display item on a display device, in the operating mode,
wherein said displaying information includes displaying information as another display item among the plurality of selectable information, which has not been set as the display item, for a predetermined time, in response to the switching instruction from the operating mode to the power off mode, and
said switching a mode includes switching the operating mode to the power off mode, after the information is displayed as the another display item among the plurality of selectable information, which has not been set as the display item, for a predetermined time.

* * * * *